(12) United States Patent
Metivier

(10) Patent No.: US 8,075,249 B2
(45) Date of Patent: Dec. 13, 2011

(54) SYSTEM AND A METHOD FOR DYNAMICALLY BALANCING A BLADE

(75) Inventor: Rémi Metivier, Paris (FR)

(73) Assignee: Eurocopter, Marignane Cedex (FR)

( * ) Notice: Subject to any disclaimer, the term of this patent is extended or adjusted under 35 U.S.C. 154(b) by 568 days.

(21) Appl. No.: 12/354,012

(22) Filed: Jan. 15, 2009

(65) Prior Publication Data

US 2009/0252608 A1    Oct. 8, 2009

(30) Foreign Application Priority Data

Jan. 23, 2008   (FR) ...................... 08 00352

(51) Int. Cl.
| F01D 1/24 | (2006.01) |
| F01D 13/00 | (2006.01) |
| F03D 3/02 | (2006.01) |
| F04D 13/04 | (2006.01) |
| F04D 25/16 | (2006.01) |

(52) U.S. Cl. ........................... 415/61; 415/144; 415/145

(58) Field of Classification Search .................... 415/61, 415/144, 145, 500
See application file for complete search history.

(56) References Cited

U.S. PATENT DOCUMENTS

| 4,150,920 A | 4/1979 | Belko et al. |
| 6,139,271 A | 10/2000 | Chadwick |
| 7,465,146 B2 * | 12/2008 | Kennedy et al. .................. 415/1 |

FOREIGN PATENT DOCUMENTS

| EP | 0 237 772 | 9/1987 |
| EP | 1 580 543 | 9/2005 |

OTHER PUBLICATIONS

French Search report dated Sep. 9, 2008, from corresponding French application.

* cited by examiner

*Primary Examiner* — David Zarneke

(74) *Attorney, Agent, or Firm* — Brooks Kushman P.C.

(57) ABSTRACT

The present invention relates to a rotorcraft blade (1) provided with a dynamic balancing system having a balancing device (10). The balancing device (10) is embedded in the inside (INT) of the body of the blade (1) in such a manner that it does not open to the outside (EXT) of said blade (1).

15 Claims, 2 Drawing Sheets

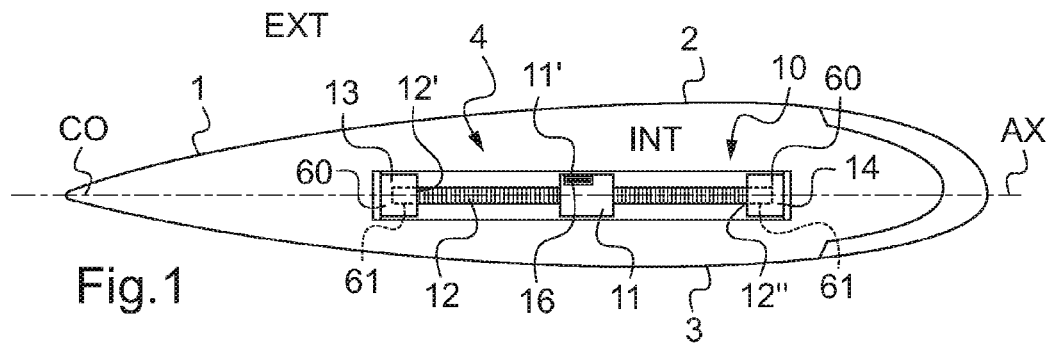
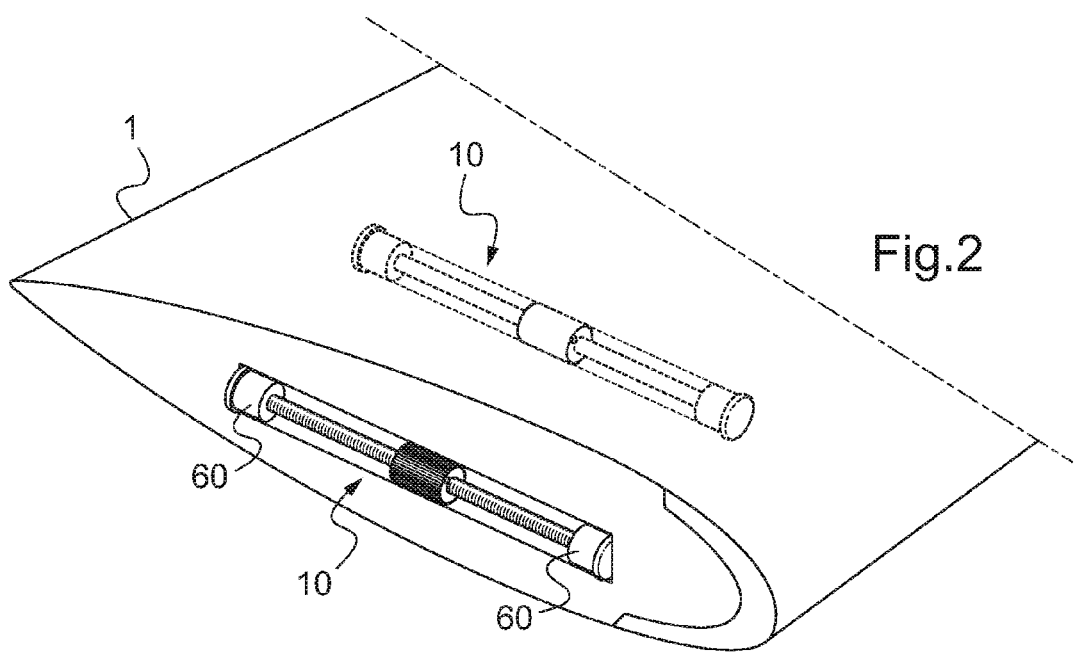
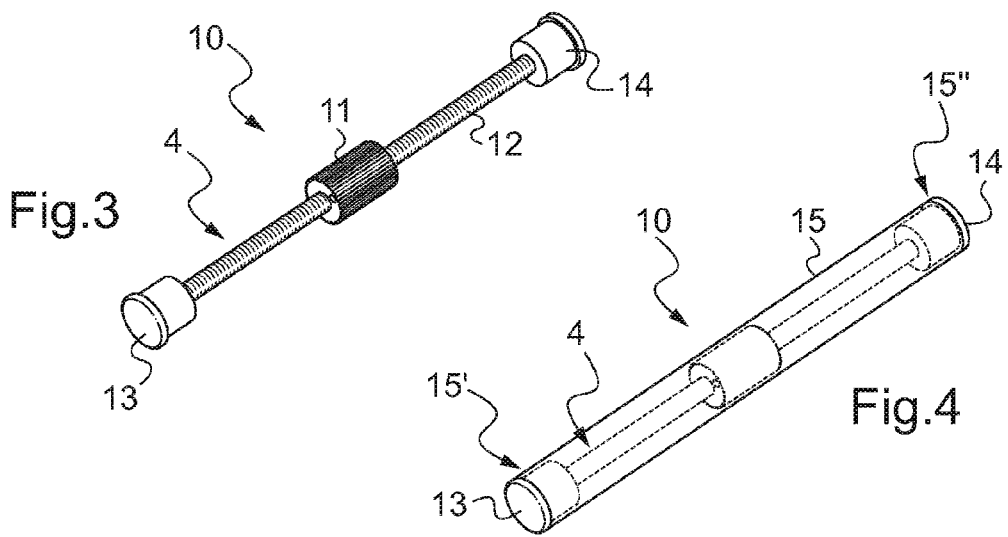

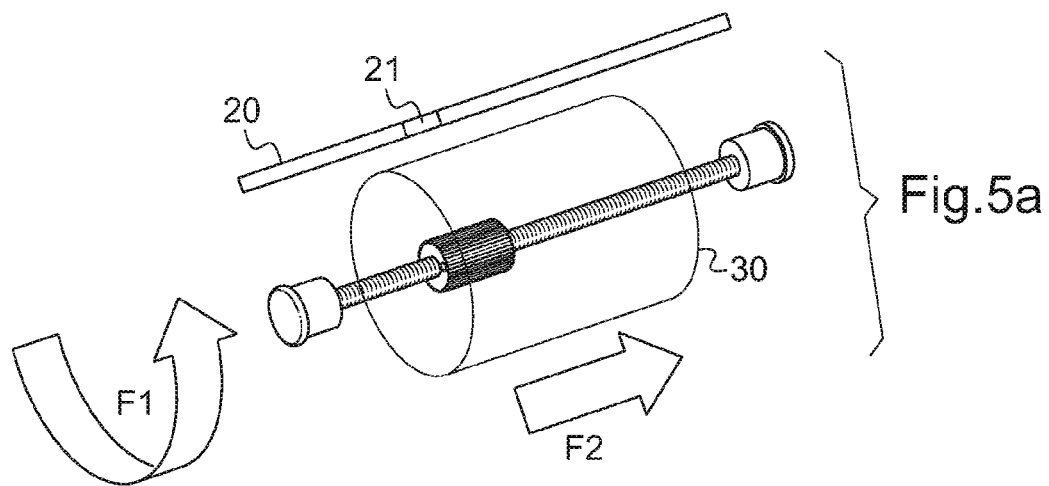
Fig.5a
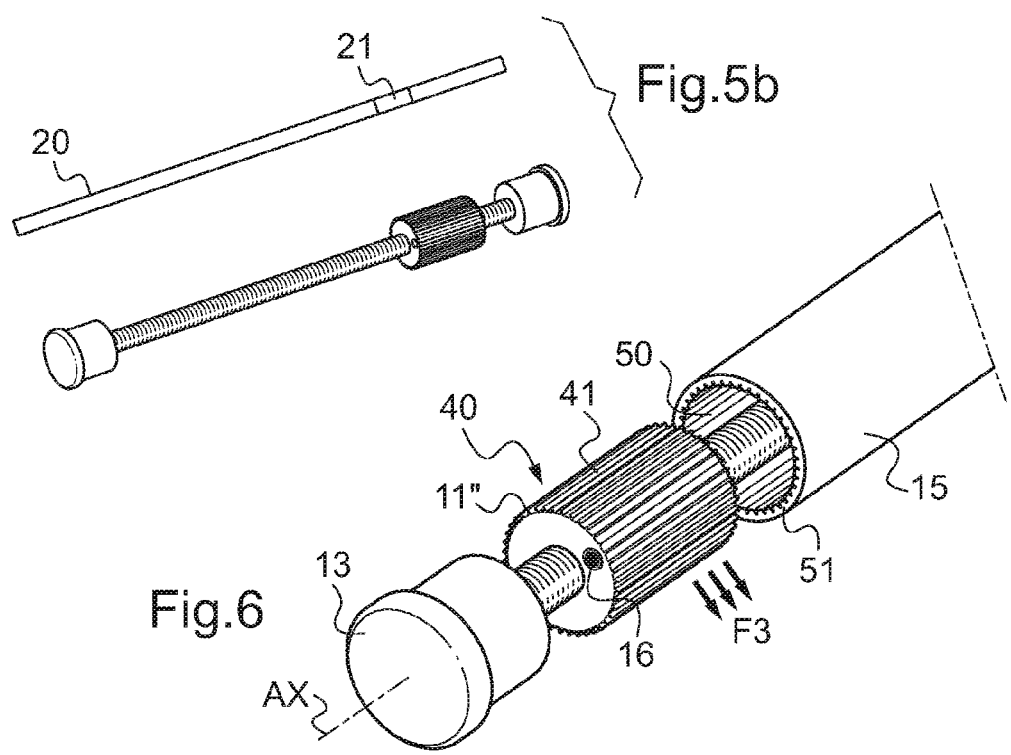
Fig.5b
Fig.6
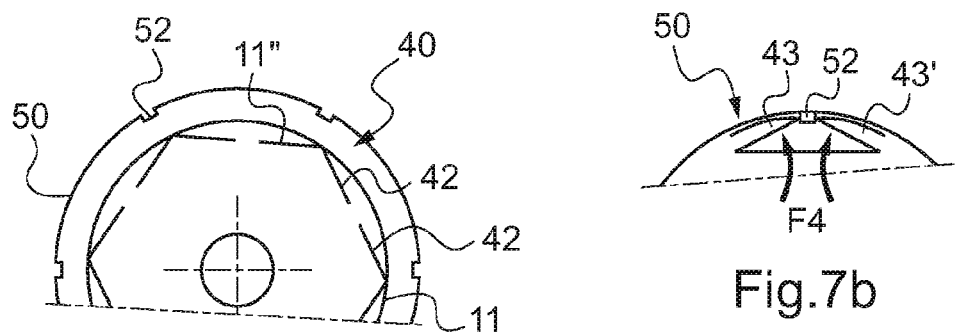
Fig.7a
Fig.7b

SYSTEM AND A METHOD FOR DYNAMICALLY BALANCING A BLADE

FIELD OF THE INVENTION

The present invention relates to a system and to a method for dynamically balancing a blade. The invention thus lies in the technical field of blades, and more particularly in the technical field of rotorcraft blades.

BACKGROUND OF THE INVENTION

The rotor that provides a rotorcraft with lift, and possibly also with propulsion in a helicopter, is made up of a plurality of blades.

Once they have been fabricated, it is found that blades present differences in terms of mass and in terms of aerodynamic characteristics. Manufacturers therefore ensure that the various fabrication tolerances are as small as possible, but differences nevertheless remain between one blade and another.

It is therefore necessary to make provision for making adjustments, known as "balancing" by the person skilled in the art, so that all of the blades present the same characteristics.

Firstly, each blade must be capable of generating the same lift at a given pitch angle.

Consequently, the blades are provided with small control surfaces that are located on their trailing edges close to their free ends, and that are known as "tabs" to the person skilled in the art. Any change to the setting of such a tab relative to the airfoil of the blade generates a force that modifies the lift of the blade.

By adjusting the setting of tabs dedicated to this function, it is possible to achieve aerodynamic balancing of the blades.

In principle, this adjustment is performed by moving each tab manually through an appropriate angle, which angle is possibly different for each of the blades. To do this, each tab is generally constituted by a metal sheet that is secured to the blade for balancing.

Nevertheless, with reference to document U.S. Pat. No. 6,322,324, it is also possible to provide actuators for controlling the inclination of blade tabs. However, it can be difficult to convey electrical power supply means or actuator control means through the rotor and the blade.

Secondly, the blades need to have the same static moment, where static moment is defined as the product of the mass of the blade multiplied by the distance between the center of gravity of the blade and the axis of rotation of the rotor.

The manufacturer thus performs static balancing by mounting heavy elements on a blade. These heavy elements modify both the mass of the blade and the position of its center of gravity, thereby modifying its static moment.

Finally, and thirdly, it is necessary to balance the blades dynamically so that they induce identical twisting moments.

To perform dynamic balancing, it is appropriate to ensure from one blade to another that the distance between the center of gravity and the thrust center of the blade is the same.

A first type of system, described in particular in document U.S. Pat. No. 4,239,456, consists in dynamically balancing a blade with the help of flyweights suspended from the blade root.

Nevertheless, given the complexity of that first type of device and its repercussions on the aerodynamic efficiency of the blade, it is more usual to use a second type of device that seeks to cause heavy elements that are inserted at the tip of the blade to move along the chord of the blade.

Document EP 0 237 772 describes a balancing system comprising a cavity that is closed by an access hatch, the cavity receiving heavy elements in a given distribution along a chord.

Document DE 4 036 708 provides for inserting blocks made up of small plates that are secured to one another by a nut in an orifice of the blade that is closed by an access hatch. Balancing is performed by adjusting the number of plates.

Similarly, document FR 2 781 196 provides for inserting heavy elements in a housing that is open to the outside in order to perform dynamic balancing while conserving a static adjustment. When the heavy elements have been placed in their housing, it is closed by means of an access hatch.

The blade described in document FR 2 315 433 has three orifices in which stacks of heavy elements are arranged.

Each stack has a threaded rod passing therethrough so that the heavy elements are held in position by a self-locking nut screwed onto the rod.

Document DE 1 955 061 provides a housing formed at the tip of a blade, two heavy assemblies spaced apart by a spring being arranged in the housing. The housing is then closed by a cover.

The heavy assemblies have a threaded rod passing through them which rod projects from the housing by passing through the cover.

By turning the threaded rod, an operator moves the assemblies along the chord of the blade in order to balance the blade.

Thus, in systems of the second type, by modifying the locations of the heavy elements in an orifice, or by modifying their masses, an operator can balance the blade.

Nevertheless, balancing is constricting insofar as it often involves a large number of operations beginning with opening/closing the access hatch of the housing and continuing with manipulation of the heavy elements.

Furthermore, it is found that systems of the second type all open to the outside of a blade. The presence of closure hatches or covers is then not sufficient to avoid corrosion occurring on the various parts making up the system concerned.

Finally, devices of the second type can lead to problems of safety in the event of an access hatch opening in untimely manner, with the heavy elements possibly being ejected from the blade.

OBJECT AND SUMMARY OF THE INVENTION

An object of the present invention is thus to propose a balancing system and an associated balancing method that enables the above-mentioned limitations to be overcome. In particular, the invention seeks to obtain a balancing system that is completely protected from corrosion, that is safe, and that is easily adjusted.

According to the invention, a rotorcraft blade provided with a balancing device and a dynamic balancing system is remarkable in that the balancing device is embedded inside the body of the blade so that it does not open to the outside of the blade.

Thus, the balancing device runs no risk of being subjected to corrosion phenomena since it does not come into contact with the outside atmosphere.

In order to ensure that the balancing device is not corroded, the invention provides a totally novel technique of embedding the balancing device inside the blade so as to avoid any contact with the outside. In spite of the fact that there is no longer any access to the balancing device, it is nevertheless possible, surprisingly, to act thereon in order to adjust it.

Similarly, it is found that no portion of the balancing device is liable to become detached, thereby damaging the blade or even giving rise to unbalance.

Furthermore, the balancing device includes at least one heavy element placed inside a cylindrical cavity of circular section that does not open to the outside of the blade, it being possible to move the heavy element remotely and without making contact therewith along a chord of said blade in which the cylindrical cavity is arranged.

In a first embodiment, the cylindrical cavity is constituted by an orifice made inside the blade during fabrication thereof.

In a second embodiment, the cylindrical cavity is produced by inserting a tube into the blade.

Whatever the embodiment, the heavy elements of the balancing device can then be moved inside the cylindrical cavity along a chord of the blade so that the person skilled in the art can balance the blade accurately.

Since this movement can be achieved remotely, the balancing device can indeed be embedded inside the blade. There is thus no need to provide an access hatch to protect the heavy element from external aggression.

The balancing device is preferably provided with a threaded rod that passes through the center of the heavy element, the heavy element being capable of turning around the threaded rod so as to be moved longitudinally along said chord. More precisely, the heavy element has a tapped bore around its longitudinal axis of rotation, which bore co-operates with the thread of the threaded rod.

The person skilled in the art then activates the heavy element remotely and without making contact therewith so that it turns about the threaded rod, such rotation leading to the heavy element moving longitudinally along the threaded rod.

The balancing device also possesses first and second plugs that are secured respectively to the first and second ends of the threaded rod, with each plug including in its central portion a material that returns to its initial shape after removal of a stress that has caused said material to deform, the threaded rod being secured to said material that constitutes the central portion of each plug.

In the first embodiment, the heavy element is placed around the threaded rod and then the first and second ends of the rod are secured to first and second plugs.

Thereafter, the balancing device is placed in the cavity formed in the blade prior to finishing fabrication of the blade, so that the balancing device is totally embedded.

In the second embodiment, the heavy element is placed around the threaded rod and then the assembly comprising the threaded rod and the heavy element is placed in a cylindrical tube. First and second plugs secured via their central portions to the first and second ends of the threaded rod are then used to close the end zones of the cylindrical tube.

This closed cylindrical tube constituting the balancing device is finally embedded in the blade during fabrication thereof.

In order to be moved along the threaded rod, the heavy element has an off-center magnet that is offset radially from a longitudinal axis of said heavy element. For example, the magnet is a magnetized bar inserted in an off-center orifice of the heavy element.

Consequently, by applying a rotary magnetic field, with the help of control means of the balancing system that may be external or that may be incorporated within the blade, the heavy element is caused to rotate by means of its off-center magnet. This rotation then causes the heavy element to move longitudinally along the threaded rod, and thus along the chord of the blade.

In order to optimize the operation of the balancing system, the heavy element is made of a non-magnetic material.

In addition, the heavy element is advantageously provided with locking means enabling it to be held in a fixed position while in flight.

The locking means serve to ensure that the heavy element cannot move in undesired manner while in flight, under the effect of the various stresses to which the blade is subjected.

When the blade is set into rotation by the hub of a rotorcraft rotor, the locking means co-operate, possibly automatically, with a peripheral wall surrounding the cylindrical cavity, i.e. a wall inside the blade in the first embodiment, or the inside periphery of the cylindrical tube in the second embodiment, so as to hold the heavy element in position in order to ensure that the blade is not unbalanced.

The locking means then allow the heavy element to move along the chord of the blade only when the blade is not set into rotation by the hub of a rotor of the rotorcraft.

In a first variant of the embodiment, the peripheral wall of the cavity includes fluting and the locking means includes notches formed on the outer periphery of the heavy element, the notches of the heavy element being suitable for co-operating with the fluting of the cavity.

Sufficient notches are provided to guarantee that co-operation is achieved without giving rise to any significant rotation of the heavy element. Consequently, co-operation between a notch with a fluting does not run any risk of causing the heavy element to move in translation and therefore does not disturb balancing.

In a second variant, the peripheral wall of the cavity carries splines, and the locking means is provided with slots formed in the outer periphery of the heavy element so that segments of said outer periphery can splay apart and take up positions on either side of a spline under the effect of centrifugal force.

The present invention also provides a method of balancing a blade.

According to the invention, a method of dynamically balancing a rotorcraft blade fitted with a dynamic balancing system provided with a balancing device embedded in the inside of the body of the blade without making opening to the outside of said blade, is remarkable in that a rotary magnetic field is generated with the help of control means in order to move a heavy element of the balancing device along a chord of the blade.

The magnetic field drives rotation of the heavy element and enables it the heavy element to move along a chord in order to balance the blade dynamically.

Advantageously, use is made of positioning means having a magnetized slider for locating accurately the position of the heavy element inside the blade. Since the heavy element is provided with a magnet, the moving magnet moves the magnetized slider. The position of the magnetized slider thus accurately represents the position of the heavy element.

Since the heavy element is embedded in the blade, it is neither visible nor accessible. This makes the positioning means very useful.

In a variant, the positioning means include a position sensor to locate accurately the position of the heavy element inside the blade.

Advantageously, the positioning means are incorporated in the control means.

Finally, two modes of operations can be envisaged.

In a first mode of operation, the heavy element can be moved only on the ground, locking means preventing the position of the heavy element changing in flight. The control means are then external and put into place on the blade when it is necessary to balance the blade.

In contrast, in a second implementation, the control means are incorporated in the blade. It is then possible to balance the blade in real time, e.g. as a function of information delivered by vibration sensors, since certain kinds of vibration are the result of poor balancing.

Thus, in a rotorcraft fitted with monitoring means that receive information relating to monitoring parameters, the monitoring means activate the control means in real time in order to position the heavy element as a function of said information.

BRIEF DESCRIPTION OF THE DRAWINGS

The invention and its advantages appear in greater detail from the following description of an embodiment given by way of illustration and described with reference to the accompanying figures, in which:

FIG. 1 is a longitudinal section of a balancing device;

FIG. 2 is a diagrammatic isometric view of a segment of a blade provided with two balancing devices;

FIG. 3 is an isometric view of a first embodiment of a balancing device;

FIG. 4 is an isometric view of a second embodiment of a balancing device;

FIGS. 5a and 5b are views for explaining the operation of the invention;

FIG. 6 shows a first variant of locking means; and

FIGS. 7a and 7b are views for explaining a second variant of locking means.

Elements that are shown in more than one of the figures are given the same reference in each of them.

MORE DETAILED DESCRIPTION

FIG. 1 is a longitudinal section of a blade 1 fitted with a balancing system.

The balancing system comprises a balancing device 10 embedded inside the blade 1, more precisely between the suction and pressure faces 2 and 3 of the blade.

Consequently, it is not possible to access the balancing device from the outside EXT of the blade 1. The balancing device is therefore protected from being subjected to corrosion phenomena, and there is no risk of losing elements that might severely damage the blade 1.

The balancing device 10 comprise a cylindrical cavity 4 of circular section, the cylinder being oriented along a chord CO of the blade, the cavity intersecting the blade's neutral axis for bending in flapping. Since the balancing device is embedded in the inside INT of the blade 1, it can be observed that the cylindrical cavity 4 does not open in any way to the outside EXT, whether via an inspection hatch or in some other way.

Furthermore, the balancing device 10 is provided with a tapped balancing weight or heavy element 11 that is engaged on a threaded rod 12. The heavy element thus has a thread that co-operates with the thread of the threaded rod 12.

The heavy element 11 acts like a nut on the threaded rod. The heavy element 11 can thus move longitudinally along the chord CO on the threaded rod 12 when it is set into rotation about its axis of rotation AX, the heavy element thus extending around the threaded rod 12 which passes through the center thereof along said axis of rotation AX.

In order to make it easier to move the heavy element, the cylindrical cavity 4 may be filled with a fluid that possesses lubricating characteristics, the fluid also limiting the effects of centrifugal force on the heavy element.

In addition, the fluid serves to limit wear of the balancing device.

Finally, whatever the embodiment, the balancing device 10 is provided with first and second plugs 13 and 14 fastened respectively to first and second ends 12' and 12" of the threaded rod.

More precisely, the central portion 60 of each plug is made of a material that returns to its initial shape after removal of a stress that has caused it to deform, e.g. it is made of elastomer. Tapped holes 61 are formed in this central portion 60 so as to enable the plugs to be screwed onto the ends of the threaded rod 12.

In addition, in order to be movable remotely and without contact, the heavy element 11 is provided with an off-center magnet 16, this magnet 16 being radially offset from the axis of rotation AX of the heavy element 11.

Thereafter a magnetized bar 16 is inserted in an orifice 11' formed in the heavy element 11, the magnetized bar 16 being adhesively bonded to the orifice 11'.

Under such conditions, the heavy element is made using a non-magnetic material so as to avoid disturbing the operation of the balancing system.

With reference to FIG. 2, it is possible to provide a plurality of balancing devices 10 depending on requirements, each balancing device being embedded in the blade 1 and comprising a threaded rod, a heavy element, and two plugs.

With reference to FIG. 3, in a first embodiment, the cylindrical cavity is obtained during fabrication of the blade 1.

The method of fabricating the blade 1 then includes steps of inserting the balancing device 10 in the blade and of ensuring that the required cylindrical cavity will be left empty.

For example, it suffices to make cutouts in two filler volumes of the blade, each filler volume presenting a slot of semicylindrical shape.

The balancing device 10 is then placed in the slot of the first filler volume, and covered using the second filler volume, while taking care to place the slots of the filler volumes into register with each other.

Alternatively, in a second embodiment shown in FIG. 4, the cylindrical cavity needed for proper operation of the balancing device 10 is situated inside a cylindrical tube 15 of circular section.

The person skilled in the art begins by engaging the heavy element 11 on the threaded rod 12 and then placed the resulting assembly inside the cylindrical tube 15.

Thereafter, the first and second plugs are screwed onto the first and second ends of the threaded rod 12. Finally, these first and second plugs completely close off the end zones 15' and 15" of the tube 15.

These operations are performed for all of the balancing devices of the blade.

Finally, each tube is embedded in a filler element made up of a thermoplastic or thermosetting matrix, or even of a metal matrix, that enables it to be held stationary and incorporated in the inside INT of the blade 1.

Whatever the embodiment, the balancing system includes control means for generating a rotary magnetic field 30.

The magnetic field causes the heavy element to rotate as shown by arrow F1, thereby leading to the heavy element moving longitudinally as shown by arrow F2. The heavy element can thus be moved from a first position shown in FIG. 5a to a second position as shown in FIG. 5b.

Since the heavy element is embedded in the blade, the operator cannot see the position of the heavy element.

Consequently, in accordance with the method of the invention, the operator places a graduated ruler 20 on the blade, which ruler has a magnetic slider 21.

Since the slider is magnetic, it automatically positions itself in register with the magnet of the heavy element, i.e. it overlies the magnet, thereby making it easy to locate it.

In a variant, it is possible to envisage implementing positions sensors in the blade 1.

The control means may be incorporated in the blade. The control means adjust the position of the heavy element of the balancing device continuously, whether or not the rotorcraft is in flight.

The adjustment is then controlled by monitoring means that receive information relating to monitoring parameters serving to activate the control means.

Alternatively, it is possible to use portable control means. Nevertheless, under such circumstances, the position of the heavy element 11 cannot be adjusted in flight.

It is then preferable to ensure that the heavy element cannot perform rotary movements under the effect of the stresses to which the blade is subjected.

Advantageously, the heavy element is provided with locking means enabling its position to be locked in flight.

When the blade is set into rotation, the locking means are subjected to high levels of centrifugal force making it possible to co-operate with a peripheral wall surrounding the cylindrical cavity.

In a first variant shown in FIG. 6, the peripheral wall 50, i.e. the inside wall of the cylindrical tube 15 of the second embodiment, is provided with longitudinal fluting 51 parallel to the axis of rotation AX of the heavy element.

The locking means 50 then comprises longitudinal notches 41 parallel to the axis of rotation AX of the heavy element, and arranged on the outer periphery of the heavy element 11.

Under the effect of centrifugal force, the threaded rod tends to move in the direction of arrows F3, this movement being made possible by the nature of the material of the central portions 60 to the plugs 13 and 14.

The notches 41 then engages the fluting 51, thereby preventing any rotary movement of the heavy element 11.

In a second variant shown in FIGS. 7*a* and 7*b*, the peripheral wall 50, i.e. the inside wall of the cylindrical tube 15 in the second embodiment, is provided with a plurality of longitudinal splines 52 extending parallel to the axis of rotation AX of the heavy element.

The locking means 40 then comprise slots 42 in the outer periphery of the heavy element 11, each slot 42 being contained in a plane that does not intersect the axis of rotation AX of the heavy element.

Under the effect of centrifugal force, segments 43, 43' of the heavy element, obtained by making said slots 42, move along arrows F4 to take up positions on either side of a spline 52, thereby preventing any rotation of the heavy element 11.

Naturally, the present invention is capable of being implemented with numerous variations. Although several embodiments are described above, it will be readily understood that it is not conceivable to identify exhaustively all possible embodiments. It is naturally possible to envisage replacing any of the means described by equivalent means without going beyond the ambit of the present invention.

What is claimed is:

1. A rotorcraft blade (1) provided with a balancing device (10) of a dynamic balancing system, wherein said balancing device (10) is embedded in the inside (INT) of the body of the blade in such a manner that it does not open to the outside (EXT) of the blade (1), said balancing device comprising at least one heavy element (11) suitable for being moved remotely and without contact along a chord (CO) of the blade (1), and said heavy element (11) is provided with locking means (40) enabling it to be held in a fixed position.

2. A blade according to claim 1, wherein, for said balancing device (10) comprising at least one heavy element (11) placed in a cylindrical cavity (4) of circular section that does not open to the outside (EXT) of the blade (1), said heavy element (1) is remotely movable without contact along a chord (CO) of said blade (1) along which said cylindrical cavity (4) is arranged.

3. A blade according to claim 2, wherein said balancing device (10) is provided with a threaded rod (12) passing through the center of said heavy element (11), said heavy element (11) being capable of turning about said threaded rod (12) so as to move longitudinally along said chord (CO).

4. A blade according to claim 3, wherein, for said balancing device (10) possessing first and second plugs (13, 14) secured to respective first and second ends (12', 12") of said threaded rod (12), each plug (13, 14) having in its central portion (60) a material that returns to its initial shape after a stress that has deformed said material pieces to be applied, said threaded rod (12) is secured to said material constituting the central portion (60) of each plug (13, 14).

5. A blade according to claim 2, wherein said cylindrical cavity (4) is filled with a fluid.

6. A blade according to claim 2, wherein said heavy element (11) includes an off-center magnet (16) that is radially offset from a longitudinal axis of rotation (AX) of said heavy element (11).

7. A blade according to claim 6, wherein said magnet (16) is a magnetized bar inserted in an off-center orifice (11') of said heavy element (11).

8. A blade according to claim 2, wherein said heavy element (11) is constituted by a non-magnetic material.

9. A blade according to claim 2, wherein, when said blade (1) is set into rotation by the hub of a rotorcraft rotor, said locking means (40) co-operate with a peripheral wall (50) surrounding the cylindrical cavity (4) so as to hold said heavy element (11) in position.

10. A blade according to claim 9, wherein said peripheral wall (50) includes fluting (51), said locking means (40) includes notches (41) formed on an outer periphery (11") of the heavy element (11), and said notches (41) of the locking means being adapted to co-operate with said fluting (51) of the peripheral wall.

11. A blade according to claim 9, wherein said peripheral wall (50) includes splines (52) and said locking means (40) includes slots (42) formed in an outer periphery (11") of the heavy element (11) so that segments (43) of said outer periphery (11') can move apart and take up positions on either side of a spline (42).

12. A method of achieving dynamic balancing of a rotorcraft blade (1) provided with a dynamic balancing system having a balancing device (10) embedded in the inside (IN) of the body of the blade (1) in such a manner as to make no contact with the outside (EXT) of said blade (1), in which method a rotary magnetic field (30) is generated with the help of control means for causing a heavy element (11) of said balancing device (10) to move along a chord (CO) of said blade (1).

13. A method according to claim 12, wherein positioning means provided with a magnetized slider (21) are used to locate accurately the position of said heavy element (11) inside said blade (1).

14. A method according to claim 12, wherein use is made of positioning means provided with a position sensor for accurately locating the position of said heavy element inside said blade.

15. A method according to claim 12, wherein, for said control means being incorporated in the blade, and for said rotorcraft being provided with monitoring means that receive information relating to monitoring parameters, said monitoring means activate the control means in real time to position said heavy element as a function of said information.

* * * * *